United States Patent Office 2,856,417
Patented Oct. 14, 1958

2,856,417
HALOHYDRINATION PROCESS

Pieter W. O. Wijga, Amsterdam, Netherlands, assignor to Shell Development Company, New York, N. Y., a corporation of Delaware No Drawing. Application October 17, 1955
Serial No. 541,020

Claims priority, application Great Britain
October 22, 1954

14 Claims. (Cl. 260—408)

This invention relates to the production of hydroxy halogenated compounds by halohydrinating the corresponding olefinic compounds. It deals with an improved process for halohydrinating olefinic compounds which are slightly soluble in water. More specifically it deals with an improved process for halohydrinating water-insoluble olefinic compounds which are non-gaseous at 0° C. and 760 mm. Hg and is of particular importance for the preparation of chlorohydrins from mono-olefinic hydrocarbons containing at least five carbon atoms per molecule.

It is known to prepare halohydrins by addition of a hypohalogenous acid to the double bond of olefinic compounds, the reaction with hypochlorous acid, for example, being

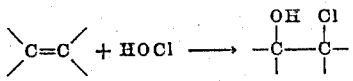

One method of carrying out this reaction consists in contacting the olefinic compound, in particular an alkene, with an aqueous solution of hypochlorous acid which may be obtained, for example, by passing chlorine into water. A solution of HOCl and HCl is thereby formed, but the concentration of HOCl therein is relatively low. The effect of the free HCl in the solution can be controlled, for example, with salts of weak acids such as carbonates and borates. Another method for effecting chlorohydrination of olefins employs an aqueous solution of alkali hypochlorite, for instance sodium hypochlorite solution prepared from chlorine and sodium hydroxide, from which the hypohalogenous acid is freed during the reaction by adding acids or acid salts. It has also been proposed by Brooks in U. S. Patent 1,394,664 to chlorohydrinate gaseous olefins by contacting them with an aqueous emulsion of a water-immiscible solvent for the olefin while feeding chlorine into the mixture. In U. S. Patent 2,463,850 Brooks points out that the higher olefins are more difficult to chlorohydrinate and recommends a modification of the alkali hypochlorite method when using such olefins as feed.

An important object of the present invention is to provide an improved method for producing halohydrins from non-gaseous, water-insoluble olefinic compounds, that is olefinic compounds which are soluble in water to the extent of less than about 0.1% at 20° C. A more particular object of the invention is the provision of an efficient method for halohydrinating normally liquid, water-insoluble olefinic compounds by passing halogen directly into an aqueous mixture comprising such olefinic compound. A special object is the production in this way of high yields of monochlorohydrins from mono-olefinic hydrocarbons of at least 5 carbon atoms per molecule, particularly alkenes having 5 to 40 carbon atoms in the molecule. Still other objects and advantages of the invention will be apparent from the following description of the new process.

According to the invention, halohydrins are produced by reacting a non-gaseous, water-insoluble olefinic compound with a halogen, for example chlorine or bromine, in an aqueous medium comprising water and an added organic liquid which is miscible with both water and the olefinic compound being hydrohalogenated. Thus chlorohydrins, for instance, are produced in accordance with the invention by passing gaseous chlorine into a reaction mixture comprising a fine dispersion or a solution of an olefinic compound of the indicated type in a mixture of water and a water-miscible organic solvent for the olefinic compound.

The organic solvents used in carrying out the process of the invention are saturated compounds which are liquid under the reaction conditions and miscible with water to the extent of at least 20% by weight at normal temperature. The most suitable organic liquids are those boiling below 200° C., preferably below 150° C. and most advantageously below 100° C. Of these it is advantageous to use oxygen-containing organic liquids made up only of oxygen, carbon and hydrogen. Suitable organic liquids of this type are, for example, alcohols such as tertiary butyl alcohol, secondary butyl alcohol, 2-methyl 2,4-pentanediol and propylalcohol; ethers such as methyl Cellosolve, dioxane, etc.; carboxylic acids such as acetic acid, isobutyric acid, and pyruvic acid; carboxylic acid esters such as methyl acetate, ethyl lactate, etc.; ketones such as acetone and diacetyl; and aldehydes such as propionaldehyde and acetaldehyde. Acetone has been found to be especially advantageous as the organic liquid in the process of the present invention, one of the advantages of using acetone being that it can be recovered and used again with relative ease, since its boiling point differs appreciably from that of water. Mixtures of organic compounds, all of which should preferably be liquids in a substantially pure state, can be successfully used as the organic liquid instead of individual compounds.

It is advantageous to use an aqueous reaction medium containing at least 50 parts by volume of organic liquid to 100 parts by volume of water in the new process. Proportions of organic liquid higher than 900 volumes to 100 volumes of water are generally less suitable. When using acetone as the organic liquid for the chlorohydrination of olefins of 8 to 24 carbon atoms per molecule, volume ratios of the order of about 300 to about 500 volumes of acetone per 100 volumes of water have been found to give the highest yields.

Surprisingly, it has been found that, when preparing chlorohydrins by the process according to the present invention, using organic liquids which usually tend to react with chlorine or hypochlorous acid, these organic liquids are not affected to any considerable degree, since the reaction rate at which the desired chlorohydrin is formed is apparently much higher than that of any of the side reactions of the solvent which would also appear to be possible under the conditions of the process.

In carrying out the process of the present invention it is found that the organic liquid (or liquids) is usually distributed between two liquid phases consisting of an aqueous phase and an organic phase containing the olefin. In such case it is believed that the organic phase also contains some water. It is, however, also feasible to operate under conditions at which the reaction mixture becomes substantially homogeneous.

It may also be advantageous in carrying out the process of the present invention to add, in a manner known per se, substances for controlling the pH of the reaction mixture. In particular, basic substances, such as hydroxides, e. g. sodium hydroxide, and carbonates, e. g. sodium bicarbonate, may be used for this purpose. The alkalinity of the reaction mixture should not be too high in order to avoid decomposition of the desired chlorohydrins. The preferred pH value depends on the reaction conditions and also on the nature of the olefin reactant, but in general the pH should not be higher than 10.

The amount of olefinic compound in the reaction mixture should preferably be at least 0.5 mole per 100 moles of water and advantageously is about 1 to about 10 moles per 100 moles of water. Ratios of halogen to olefinic compound between about 75 and 140 mole percent of the theoretical requirement for the desired halohydrination can be employed in the reaction although it has been found to be usually most advantageous to use an excess of the order of about 5 to 15% since higher ratios do not increase the yield or conversion and lower ratios result in decreased conversion as well as some loss in yield.

The process of the invention is carried out under conditions at which the olefinic compound being halohydrinated, the organic solvent and the water are present in the liquid phase. Thus temperatures not above the boiling point of the reaction mixture at the existing pressure are used. The reaction can be carried out at room temperature or at even lower temperatures, although higher temperatures are usually preferred. If desired, the reaction can be carried out under pressure, in which case a higher temperature can be employed. Temperatures in the range of about 5° to about 40° C. are advantageous since the yields and conversions are generally independent of temperature in this range while at higher temperatures they both may decrease somewhat. A reaction time of the order of about 5 minutes to about one hour is usually satisfactory.

The process can be conducted batchwise, continuously or intermittently. One suitable method for batch reaction comprises intimately contacting the water-insoluble olefinic compound or mixture thereof being halohydrinated with water and an organic solvent of the type described while passing in halogen, for instance gaseous chlorine or liquid bromine and preferably agitating the mixture under controlled temperature conditions to secure uniform dispersion of the components of the mixture. The process can be made continuous by pumping the mixture of olefinic compound, solvent and water continuously through a suitable reactor preferably provided with temperature control means. The reactor can be a stirred vessel or a tubular reactor through which the mixture is passed at a rate which insures adequate mixing. The halogen is added to the mixture in the reactor and after an adequate reaction period the mixture is withdrawn for recovery or further reaction of the product depending on its intended use.

A large number of different water-insoluble olefinic compounds have been successfully halohydrinated. As previously pointed out the process is of particular importance for the preparation of chlorohydrins from mono-olefinic hydrocarbons containing at least five carbon atoms in the molecule. These hydrocarbons can contain one or more aryl groups in the molecule, as for example, in styrene. The invention is, however, especially suitable for chlorohydrination of alkenes having 5 to 40, preferably 8 to 24, carbon atoms in the molecule. This application of the new process is emphasized in the following examples in which the relationship between the parts by weight and the parts by volume is that which exists between the kilogram and the litre. These examples are given merely as illustrative of the invention rather than limitative of it, as the scope includes other methods of operation with these and other non-gaseous, water-insoluble olefinic compounds.

*Example I*

One hundred parts by volume of water, 400 parts by volume of acetone and 50 parts by volume of a crude olefin mixture were added to a reaction vessel fitted with a stirrer, means for passing gaseous chlorine through the reaction mixture and means for either heating or cooling the reaction mixture. The crude olefin mixture comprised olefins having from 13 to 15 carbon atoms in the molecule and obtained by cracking solid paraffin wax, distilling the product: it had an alkene content of 85% by weight; the balance being substantially saturated hydrocarbons.

Fifteen parts by weight of chlorine were introduced into the reaction vessel over a period of 20 minutes, the reaction mixture being stirred vigorously and the reaction temperature being kept at approximately 20° C. by means of cooling.

After all the chlorine had been introduced, the acetone was distilled off until a bottom temperature of 100° C. was reached. The residue consisted of an organic liquid phase and an aqueous phase. After these two phases had been separated, the organic liquid was neutralized with solid potassium carbonate and afterwards dried by means of sodium sulfate. The hydroxyl number of this product showed that 28.5 parts by weight of $C_{13}$–$C_{15}$ alkylchlorohydrin had been formed. This corresponds to a yield of 73 mole percent, calculated on the converted alkene. When the reaction is carried out in the same way without an added organic liquid the yield is only 10 mole percent.

The process was also carried out with added acetone under the same conditions except that 25 parts by weight of sodium bicarbonate were added to the reaction mixture before the introduction of chlorine was commenced. The pH control effected in this way resulted in a higher yield of $C_{13}$–$C_{15}$ alkylchlorohydrins, namely 80 mole percent, being obtained.

*Example II*

Hexadecylchlorohydrin was prepared from hexadecene-1 in a yield of 78.3 mole percent by the process described in the first part of Example I using the same proportions of acetone and of reactants. A chlorohydrin melting from 41.8 to 43.2° C. was obtained from the crude reaction product by recrystallization from heptane. Infrared analysis showed that the compound obtained contained a primary hydroxyl group. According to the infrared analysis, however, chlorohydrins having a secondary hydroxyl group also were present in the crude reaction product from which the primary hydroxy hexadecylchlorohydrin was separated. Thus, the hydrochlorinating process evidently yields a mixture consisting of the isomers

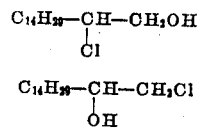

*Example III*

The process of the present invention was carried out substantially as described in Example I, but with various different organic solvents. The olefinic starting material was a $C_{13}$–$C_{15}$ cracked wax olefin mixture as in Example I and the amount of this material used in each run was 50 parts by volume. Water and the organic liquid were added in a total amount of 500 parts by volume, so the same concentration of olefin, 9.1% by volume, was present in each run.

Chlorine gas was again introduced during a period of 20 minutes, the total amount added in each case being such as to provide a 15% excess of the theoretical requirement.

The results obtained in the various runs are shown in the followin table:

| Solvent | Amount of Solvent, Percent by Volume | Yield of Alkylchlorohydrins, Mole percent |
|---|---|---|
| Acetaldehyde | 40 | 30.9 |
| Chloral | 80 | 24 |
| Methyl ethyl ketone | 30 | 49.8 |
|  | 50 | 58.0 |
|  | 70 | 65.9 |
|  | 80 | 60.2 |
| Tetrahydrofurane | 60 | 26.4 |
| Dioxane | 80 | 43 |
| Butylamine | 20 | ca. 40 |
| Pyridine | 20 | ca. 40 |
| Butyric acid | 40 | ca. 40 |
| Ethanol | 60 | 41 |
|  | 80 | 35 |
|  | 20 | 23 |
| Propanol-1 | 40 | 56 |
|  | 50 | 49 |
|  | 60 | 51 |
| Tert. Butanol | 30 | 41 |
|  | 60 | 62 |

Example IV

The process of the present invention was carried out continuously in a vertical tubular reactor provided with a stirrer. A mixture of acetone and the olefin was introduced at the bottom of the reactor, and water was also introduced at the bottom of the reactor through a separate inlet. Chlorine gas was introduced into the reactor at a higher point so as to contact the already thoroughly mixed liquids. The temperature of the reaction mixture was maintained at 20° C. by external cooling and the reaction mixture was withdrawn from the upper end of the reactor.

The olefinic starting material was a rather sharp $C_{14}$ distillation cut from a crude olefin mixture obtained by cracking paraffin wax and refining the distillate with $H_2SO_4$.

A series of runs using various relative proportions of chlorine, olefin, water and acetone were made and the results are shown in the following table:

| Liquid Components Introduced (Parts by Volume/Hour) | | | Chlorine Introduced (Percent of theory) | Conversion of Olefin, Percent | Yield of Chlorohydrin, Mole Percent |
|---|---|---|---|---|---|
| Olefin | Acetone | Water | | | |
| 50 | 400 | 100 | 96.1 | 91.8 | 78.5 |
| 50 | 400 | 100 | 111 | 98.3 | 77.8 |
| 50 | 400 | 100 | 136 | 98.3 | 76.7 |
| 25 | 400 | 100 | 110 | 97.9 | 80.4 |
| 100 | 400 | 100 | 110 | 96.2 | 68.3 |
| 93 | 450 | 50 | 110 | 96.4 | 65.9 |
| 50 | 300 | 200 | 110 | 78.1 | 72.7 |

Example V

Chlorohydrination of ethylenically unsaturated higher fatty oils by the process as described in Example I likewise gives good yields of the corresponding chlorohydrins. Cottonseed oil of iodine number 96.5, olive oil of iodine number 70, and soybean oil of iodine number 132, for instance, each chlorohydrinated by use of 80 volumes of acetone and 20 volumes of water with 10 volumes of fatty oil at about 20° C. and about 10% excess chlorine all give good yields.

Example VI

The experiments listed in the following table were carried out with the olefinic material of Example IV, in order to study the influence of the water/acetone ratio. The amount of chlorine introduced was 110 mol. percent, based on the amount theoretically required, and the reaction temperature was 20° C. The process was carried out continuously.

| Liquid components introduced (ml./h.) | | | Yield, wt. Percent |
|---|---|---|---|
| olefin | acetone | water | |
| 50 | 0 | 500 | 6.3 |
| 50 | 300 | 200 | 72.7 |
| 50 | 350 | 150 | 74 |
| 50 | 400 | 100 | 76.7 |
| 50 | 415 | 85 | 76.1 |
| 50 | 438 | 62 | 76 |
| 50 | 459 | 41 | 72.2 |

This table shows that optimal yields are obtained with water/acetone mixtures containing from 70 to about 85 vol. percent, calculated on the total amount of acetone and water.

Example VII

In the following tests carried out with the olefinic material of Example IV, the olefin concentration was varied. The acetone/water ratio was 400:100. The total amount of liquid introduced into the reactor was 550 ml. per hour. The amount of chlorine introduced was 110 mol. percent, based on the amount theoretically required. The reaction temperature was 20° C. The process was carried out continuously.

| ml. olefin per hour | Conversion | Yield |
|---|---|---|
| 12.5 | 97.8 | 84.5 |
| 25 | 97.9 | 80.4 |
| 50 | 98.3 | 76.7 |
| 100 | 96.2 | 68.3 |

Example VIII

In order to estimate the optimal reaction temperature, a series of experiments was carried out, the results of which are listed in the following table. The olefin:acetone:water ratio was 50:400:100. The amount of chlorine introduced was 110 mol. percent, based on the amount theoretically required. The process was carried out continuously. The olefinic material and the total amount of liquid introduced into the reactor was the same as in Example VII.

| Temperature in ° C. | Conversion, mol. percent | Yield, mol. percent |
|---|---|---|
| 4.5 | 98.9 | 76.8 |
| 21.5 | 98.3 | 76.7 |
| 40 | 97.8 | 77.6 |
| 55 | 96.2 | 71.6 |

This table shows that within the range from about 0° C. to 40° C. the yield does not change materially, though the best yield is obtained at 40° C.

Example IX

NaOH was added to the water in an amount which was equivalent to the quantity of olefin added. The pH of the mixture was between 1 and 2, the further reaction conditions being the same as in Example VII. The results are listed below.

| ml. olefin per hour | Conversion percent | Yield mol. percent |
|---|---|---|
| 12.5 | 100 | 87.0 |
| 25.0 | 98.9 | 87.3 |
| 50.0 | 99.5 | 84.3 |
| 100.0 | 98.9 | 79.0 |

Example X

Into a round-bottomed flask provided with a stirrer and a dropping funnel was introduced a suspension of 35 g. of sodium bicarbonate and 21 g. of sodium carbonate in a mixture of 800 ml. of acetone, 200 ml. of water and 100 ml. of $C_{14}$ olefins (366 m. mol.). While stirring the reaction mixture 64 g. of bromine was added dropwise thereto in the course of three hours. The reaction was continued until the dark colour of bromine had disappeared. 116 g. of a product was obtained, having 118 m. eq. of hydroxyl groups. This corresponds to a yield of 33 mol. percent, calculated on the bromohydrin formed.

It will be understood that the foregoing examples are merely illustrative and that the present invention broadly comprises the halohydrination of non-gaseous, water-insoluble ethylenically unsaturated compounds by passing the corresponding free halogen into an aqueous mixture of the ethylenic compound with a saturated organic solvent which is miscible with water and the ethylenic compound under the existing halohydrinating conditions. Thus specific examples of ethylenic compounds other than those used in the foregoing examples, well adapted for use in the process, include allyl chloride giving glycerol dichlorohydrins for instance, oleic acid giving a mixture of 9-hydroxy-10-chloro-octadecanoic acid and its 9-chloro-10-hydroxy isomer for instance, butyl oleate giving the corresponding halohydrinated butyl esters, butyl esters of cottonseed fatty acids (iodine number 83), and the like. It will thus be seen that many different embodiments of the invention can be made without departing from the scope and spirit thereof, and that the invention is limited only as defined in the appended claims.

I claim as my invention:

1. A process converting a non-gaseous water-insoluble ethylenic compound to a halohydrin of the group consisting of chlorohydrins and bromohydrins which comprises feeding free halogen of the group consisting of chlorine and bromine into an aqueous mixture of said ethylenic compound and a saturated organic liquid solvent for said ethylenic compound which is miscible with water to the extent of at least 20% by weight at normal temperature.

2. A process for chlorohydrinating a water-insoluble ethylenic compound having 5 to 40 carbon atoms per molecule which comprises feeding gaseous chlorine into a liquid aqueous mixture of said ethylenic compound and a saturated organic liquid solvent for said ethylenic compound which is miscible with water to the extent of at least 20% by weight at normal temperature.

3. A process in accordance with claim 2 wherein about 50 to about 900 volumes of said saturated organic liquid are used per 100 volumes of water in the reaction mixture.

4. A process for chlorohydrinating a water-insoluble ethylenic hydrocarbon having 5 to 40 carbon atoms per molecule which comprises feeding gaseous chlorine into a liquid aqueous mixture of said ethylenic hydrocarbon and a saturated organic liquid solvent for said ethylenic hydrocarbon in which solvent the said desired reaction takes place without reaction of the solvent boiling below 200° C. and is miscible with water to the extent of at least 20% by weight at normal temperature.

5. A process in accordance with claim 4 wherein the saturated organic liquid boils between about 20° and 150° C.

6. A process for chlorohydrinating a water-insoluble monoethylenic hydrocarbon having 8 to 24 carbon atoms per molecule which comprises feeding gaseous chlorine into a liquid aqueous mixture of said ethylenic hydrocarbon and a liquid saturated organic carbonyl compound solvent for said ethylenic hydrocarbon which solvent contains in the molecule only carbon, hydrogen and oxygen atoms and is miscible with water to the extent of at least 20% by weight at normal temperature.

7. A process in accordance with claim 6 wherein about 50 to about 900 volumes of saturated organic liquid carbonyl compound boiling below about 100° C. are used per 100 volumes of water in the reaction mixture.

8. A process for chlorohydrinating an alkene having 8 to 24 carbon atoms per molecule which comprises passing chlorine into a liquid mixture of said alkene, water and a saturated ketone which is miscible with water to the extent of at least 20% by weight at normal temperature which mixture contains about 50 to about 900 volumes of said ketone per 100 volumes of water.

9. A process in accordance with claim 8 wherein an excess of chlorine not greater than 120% of the theoretical requirement for the reaction is added to the reaction mixture.

10. A process for converting a non-gaseous water-insoluble ethyleneic compound to a halohydrin of the group consisting of chlorohydrins and bromohydrins which comprises feeding free halogen of the group consisting of chlorine and bromine into an aqueous mixture of said ethylenic compound, water and acetone containing about 50 to about 900 volumes of acetone per 100 volumes of water.

11. A process for chlorohydrinating alkene of 8 to 24 carbon atoms per molecule which comprises feeding gaseous chlorine into an aqueous mixture of said alkene, water and acetone containing about 300 to about 500 volumes of acetone per 100 volumes of water and at least one mole of alkene per 100 moles of water.

12. A process of chlorohydrinating alkene of 8 to 24 carbon atoms per molecule which comprises feeding gaseous chlorine into an aqueous mixture of said alkene, water and methyl ethyl ketone containing about 50 to about 900 volumes of methyl ethyl ketone per 100 volumes of water.

13. A process for chlorohydrinating higher ethylenic unsaturated fatty acid esters which comprises feeding gaseous chlorine into an aqueous mixture of said ester, water and acetone containing about 50 to about 900 volumes of acetone per 100 volumes of water.

14. A process for chlorohydrinating an alkene of 13 to 16 carbon atoms per molecule which comprises feeding gaseous chlorine into a substantially homogeneous mixture of said alkene, water and acetone at about 5° to about 40° C.

References Cited in the file of this patent

UNITED STATES PATENTS

| | | |
|---|---|---|
| 1,498,781 | Brooks | June 24, 1924 |
| 1,498,782 | Brooks | June 24, 1924 |

FOREIGN PATENTS

| | | |
|---|---|---|
| 402,880 | Great Britain | Dec. 14, 1933 |